(12) United States Patent
Makhijani et al.

(10) Patent No.: US 11,080,596 B1
(45) Date of Patent: Aug. 3, 2021

(54) PREDICTION FILTERING USING INTERMEDIATE MODEL REPRESENTATIONS

(71) Applicant: Amazon Technologies, Inc., Seattle, WA (US)

(72) Inventors: Roshan Harish Makhijani, Boston, MA (US); Soo-Min Pantel, Bellevue, WA (US); Sanjeev Jain, Redmond, WA (US); Gaurav Chanda, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1072 days.

(21) Appl. No.: 15/623,291

(22) Filed: Jun. 14, 2017

(51) Int. Cl.
  *G06N 3/08* (2006.01)
  *G06N 5/04* (2006.01)
  *G06F 7/523* (2006.01)
  *G06N 3/04* (2006.01)

(52) U.S. Cl.
  CPC .............. *G06N 3/08* (2013.01); *G06F 7/523* (2013.01); *G06N 3/0445* (2013.01); *G06N 5/04* (2013.01)

(58) Field of Classification Search
  CPC .......... G06N 3/08; G06N 3/0445; G06N 5/04; G06F 7/523
  See application file for complete search history.

(56) References Cited

U.S. PATENT DOCUMENTS

2017/0357896 A1* 12/2017 Tsatsin ................. G06N 3/0454

OTHER PUBLICATIONS

Hidasi et al. Session-Based Recommendations With Recurrent Neural Networks. Published as a conference paper at ICLR 2016 (Year: 2016).*
Deshpande et al. Item-Based Top-N Recommendation Algorithms. ACM Transactions on Information Systems, vol. TBD, No. TBD, TBD 20TBD, pp. 1-34. (Year: 2006).*
Zhang et al. Collaborative Knowledge Base Embedding for Recommender Systems. KDD '16, Aug. 13-17, 2016, San Francisco, CA, USA (Year: 2016).*
Shen, Y., Jin, R., Chen, J., He, X., Gao, J., & Deng, L. (2016). A Deep Embedding Model for Co-occurrence Learning. In Proceedings—15th IEEE International Conference on Data Mining Workshop, ICDMW 2015. (Year: 2015).*
Grbvic et al. E-commerce in Your Inbox: Product Recommendations at Scale. KDD '15, Aug. 10-13, 2015, Sydney, NSW, Australia (Year: 2015).*

* cited by examiner

*Primary Examiner* — Alexey Shmatov
*Assistant Examiner* — Robert Bejcek, II
(74) *Attorney, Agent, or Firm* — Knobbe, Martens, Olson & Bear, LLP (57) ABSTRACT

The present disclosure is directed to filtering co-occurrence data. In one embodiment, a machine learning model can be trained. An output of an intermediate structure of the machine learning model (e.g., an output of an internal layer of a neural network) can be used as a representation of an event. Similarities between representations of events can be determined and used to generate, augment, or modify co-occurrence data.

20 Claims, 7 Drawing Sheets

PREDICTION FILTERING USING INTERMEDIATE MODEL REPRESENTATIONS

Models representing data relationships and patterns, such as functions, algorithms, systems, and the like, may accept input (sometimes referred to as an input vector), and produce output (sometimes referred to as an output vector) that corresponds to the input in some way. For example, a machine learning model may be implemented as an artificial neural network ("NN"). Artificial neural networks are artificial in the sense that they are computational entities, analogous to biological neural networks in animals, but implemented by computing devices. Output in NN-based models is obtained by doing a "forward pass." The forward pass involves multiplying large NN weight matrices, representing the parameters of the model, by vectors corresponding to input feature vectors or hidden intermediate representations. In certain systems, such as systems designed to provide customized content (e.g., content with recommendations for goods and/or services) to users based on the content interaction histories of the users, NN-based models may generate probability scores via the forward pass using content interaction histories. The probability scores may indicate the probabilities of a user performing some future interaction, such as purchasing or otherwise acquiring items during a time period. The parameters of a NN can be set in a process referred to as training.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to embodiments of filtering noise or otherwise improving accuracy in event prediction by using encoded representations of information regarding events to be predicted. More specifically, the present disclosure describes embodiments of training a machine learning model, such as an artificial neural network (NN), to predict the occurrence of future events based on the occurrences of past events. Data regarding the internal state of the machine learning is then used to determine similarities or differences between events. The similarities or differences can be used to identify and filter dissimilar events predicted by other models or systems, augment events predicted by other models or systems, and the like.

In some embodiments, occurrences of one type of event associated with a user can be arranged in a chronological order as elements of an event vector. The occurrences of the type of event with respect to two objects (such as two items) represented by two adjacent elements of the event data vector occur close in time or one after another. To generate training input and corresponding truth data, a running window of a fixed size can be implemented. The training input can include a plurality of training data input vectors. The truth data can include a plurality of reference data output vectors. For example, with a running window of size 10, an input vector can include occurrences represented by elements at positions 0 to 8 of the event data vector. A reference vector can include an occurrence represented by the element at position 9 of the event data vector. With an overlap of 9 (or an increment of one), another input vector can include occurrences represented by elements at positions 1 to 9 of the event data vector. Another reference vector can include an occurrence represented by element at position 10 of the event data vector. The input vectors and reference vectors can be used to train a machine learning model (e.g., an embedding space machine learning model, such as a NN) that will be used to determine the differences or similarities between events, objects, and the like.

The trained model can be used to determine data representing a likelihood of co-occurrence of events with respect to different objects of a plurality of objects. For example, an intermediate vector representing the output of an internal layer of an embedding space NN can be determined using an input vector corresponding to a first object. The intermediate vector can be used as a representation of the first object. Similarly, an intermediate vector representing the output of the internal layer of the first NN can be determined using an input vector corresponding to a second object. The intermediate vector can be used as a representation of the second object. The similarity between the first and second objects can be determined using the intermediate vector of the first object, the intermediate vector of the second object, and a distance function, such as a cosine distance function. The distance can be used to generate, augment, or modify co-occurrence data regarding the two objects. For example, the likelihood of co-occurrence of events with respect to the two objects can be determined based on the distance, such as an inverse of the distance. As another example, if the distance satisfies a distance threshold (e.g., above the distance threshold), then the likelihood of co-occurrence with respect to the two objects in existing co-occurrence data can be removed. As another example, the likelihood of occurrence with respect to the two events can be set as a weighted sum of the existing likelihood of co-occurrence in the existing co-occurrence data and an inverse of the distance.

In one specific, non-limiting embodiment, a second neural network, such as a prediction NN, can be trained using the data representing the likelihood of co-occurrences between individual objects of the plurality of objects. The prediction NN can be used to generate neural network output using input data representing various types of events, such as input representing a certain type of event (e.g., a viewing event, a listening event, a reading event, a watching event, a searching event, an interaction event). For example, the output values generated using the prediction NN may be associated with the likelihood that certain future events will occur, given the occurrence of certain past or current events.

Various aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrative only, and are not intended to be limiting. For example, certain aspects of the disclosure will be described using a particular machine learning model, such as a NN, for purposes of illustration only. For brevity, these aspects may not be described with respect to each possible machine learning model that may be used. In practice, however, many or all of the aspects of the disclosure may apply to other machine learning models, including but not limited to those described herein. Examples of machine learning models that may be used with aspects of this disclosure include classifiers and non-classification machine learning models, artificial neural networks (NNs), linear regression models, logistic regression models, decision trees, support vector machines (SVMs), Naïve or a non-Naïve Bayes network, k-nearest neighbors (KNN) models, k-means models, clustering models, random forest models, or any combination thereof. For example, certain aspects of the disclosure will be described using events or behaviors (such as clicking, viewing, or watching) with respect to items (e.g., products, videos, or songs), for purposes of illustration only. For brevity, these aspects may not be described with respect to events or behaviors regarding objects (e.g., data objects, such as search strings).

Example Artificial Neural Network

Figure 1A:
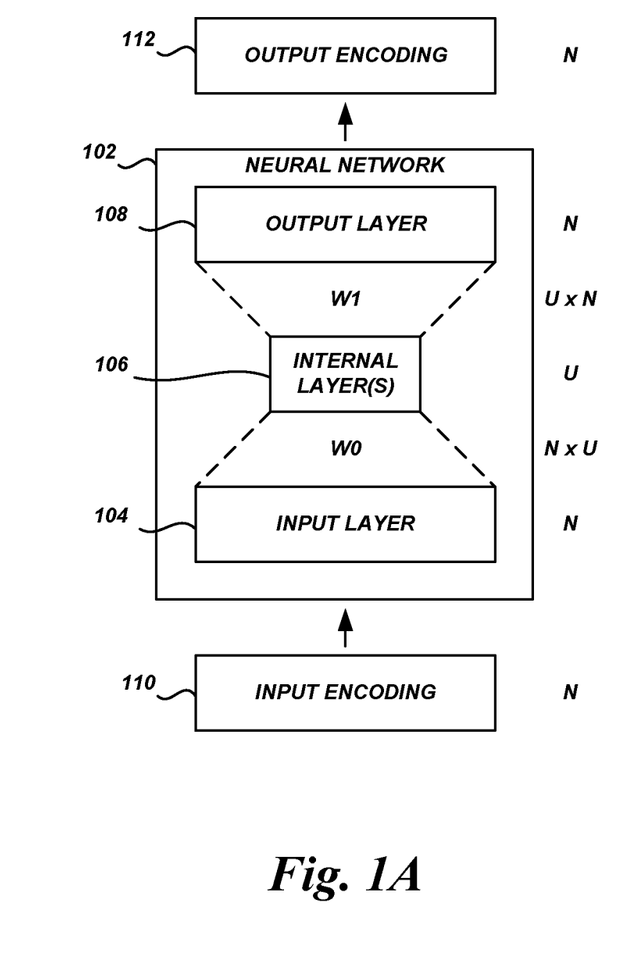
FIG. 1A is a diagram of an illustrative artificial neural network trained using data regarding one or more occurrences of a type of event according to some embodiments.
Figure 1B:
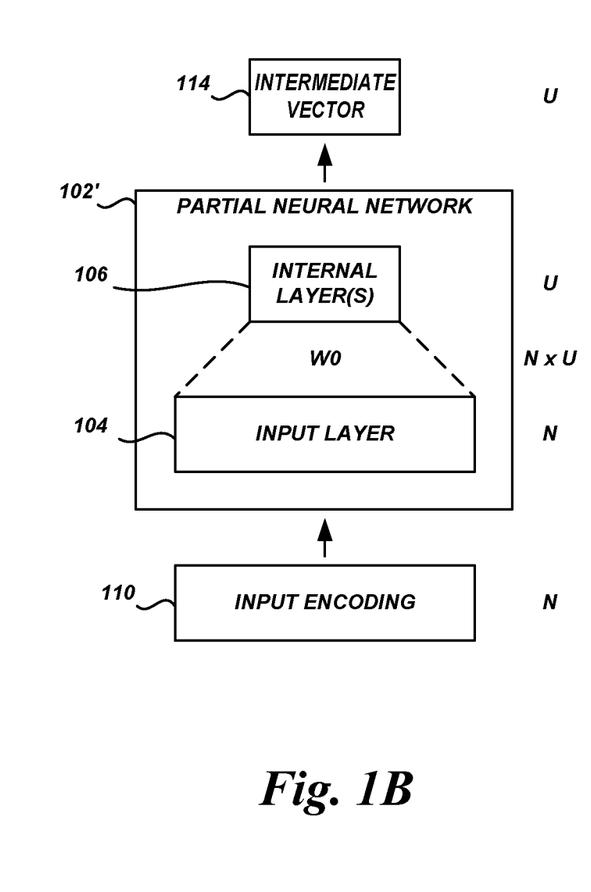
FIG. 1B is a diagram of an illustrative partial artificial neural network of the artificial neural network illustrated in FIG. 1A for generating an intermediate vector corresponding to an output of an internal layer of the artificial neural network according to some embodiments.

FIG. 1A is a diagram of an illustrative artificial neural network trained using data regarding one or more occurrences of a type of event, based on, e.g., data regarding the prior occurrence of various events according to some embodiments. FIG. 1B is a diagram of an illustrative partial artificial neural network of the artificial neural network illustrated in FIG. 1A for generating an intermediate vector corresponding to an output of an internal layer of the artificial neural network according to some embodiments.

Generally described, NNs, including but not limited to deep neural networks ("DNNs"), have multiple layers of nodes. Illustratively, a NN may include an input layer, an output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. When a NN is used to process input data in the form of a matrix of input vectors (e.g., a batch of training data input vectors), the NN may perform a "forward pass" to generate a matrix of output vectors. The input vectors may each include N separate data elements or "dimensions," corresponding to the N nodes of the NN input layer (where N is some positive integer). Each data element may be a value, such as a floating-point number or integer. The forward pass includes multiplying the matrix of input vectors by a matrix representing the weights associated with connections between the nodes of the input layer and nodes of the next layer, and applying an activation function to the results. The process is then repeated for each subsequent NN layer.

The parameters of a NN can be set in a process referred to as training. For example, a NN may be designed for item recommendation generations. The NN may be trained using training data that include purchase histories of existing items. The trained NN may perform item recommendation generations for the existing items based on the purchase histories of users of the existing items. For example, a NN-based model can be trained using training data that includes input data and the correct or preferred output of the model for the corresponding input data. The NN can repeatedly process the input data, and the parameters (e.g., the weight matrices) of the NN can be modified in what amounts to a trial-and-error process until the model produces (or "converges" on) the correct or preferred output.

As shown in FIG. 1A, an example NN 102 has an input layer 104 with a plurality of nodes, one or more internal layers 106 with a plurality of nodes, and an output layer 108 with a plurality of nodes. In some embodiments, as shown, the input vectors 110 and/or the output vectors 112 may each include N separate data elements or "dimensions" (where N is some positive integer). The input vector 110 can be encoded using, for example, one-hot encoding in which only one element has a non-zero or non-null value. In general, an input vector 110 that is encoded can be referred to as an input encoding. The output vector 112 can also be encoded using, for example, one-hot encoding. An output vector 112 that is encoded can be referred to as an output encoding. The NN input layer 104 may include N nodes of the NN input layer. In some embodiments, the input vector 110 can include data representing behavior information of a user with respect to a plurality of objects (e.g., items, data objects such as search strings, etc.), or data representing actual occurrences or probabilities of occurrences of other events. An output vector 112 can include N elements. Each data element of the output vector 112 may be a value, such as a floating-point number or integer. In some embodiments, the elements of the output vector 112 can correspond to a probability of the occurrence of some event, such as a user purchasing an item or performing some other action (e.g., performing a search) during a subsequent time period.

Input to a NN, such as the NN 102 shown in FIG. 1A, occurs at the input layer 104. A single input to the NN 102 may take the form of an input vector with N data elements, where N is the number of nodes in the input layer 104. The connections between individual nodes of adjacent layers each is associated with a trainable parameter, or weight, that is applied to the value passed from the prior layer node to the activation function of the subsequent layer node. The weights associated with the connections from the input layer 104 to the internal layer 106 it is connected to may be arranged in a weight matrix W0 with a dimension of N×U, where N denotes the dimensionality of the input layer 104 and U denotes the number of nodes in an internal layer 106. The weights associated with the connections from the internal layer 106 (or, if the NN 102 has multiple internal layers, the internal layer that is adjacent to the output layer 108) to the output layer 108 may be arranged in a weight matrix W0, similar to the weight matrix W0. The weight matrix W1 has a dimension of U×N, where U denotes the number of nodes in the internal layer 106 and N denotes the dimensionality of the output layer 108. The model size of the NN 102, in terms of the number of weights, may be 2×U×N.

As described below with reference to FIG. 2, in some embodiments one or more input vectors 110 and corresponding output vectors used for training the NN 102 can be based on the behavior information or event-based information of one or more users with respect to individual objects of a plurality of objects. Such vectors of training input and truth data can be referred to as training data input vectors and reference data output vectors respectively in the context of training the NN 102. Events that are close in time or that are one after another (even if there is a gap in time between two consecutive events) can be considered related. For example, a user can be associated with a plurality of events, such as 10 events, arranged in chronological order. An input vector can be generated to represent the first two events in time. A corresponding output vector can be generated to represent the third event in time. A second input vector can be generated to represent the second and third events in time. A corresponding output vector can be generated to represent the fourth event in time. Advantageously, in this example eight input vectors and eight corresponding output vectors can be generated based on 10 events associated with a user.

The specific number of layers shown in FIG. 1A is illustrative only, and is not intended to be limiting. In some NNs, different numbers of internal layers and/or different numbers of nodes in the input, internal, and/or output layers may be used. For example, in some NNs the layers may have hundreds or thousands of nodes. As another example, in some NNs there may be 1, 2, 4, 5, 10, or more internal layers. In some implementations, each layer may have the same number or different numbers of nodes. For example, the internal layers 106 can include the same number or different numbers of nodes as each other. As another example, the input layer 104 or the output layer 108 can each include more nodes than the internal layers 106. The input layer 104 and the output layer 108 of the NN 102 can include the same number or different numbers of nodes as each other.

In some embodiments, the input vector 110 of the NN 102 can include data representing behavior and/or other event-based information of a user with respect to a plurality of objects (e.g., items, data objects, such as search strings). For example, the elements of the input vector 110 can include data representing a purchase history, a viewing history, a listening history, a reading history, a watching history, a searching history, or an interaction history of a user. As another example, the individual elements of the input vector 110 may correspond to individual items a user can purchase, view, or interact with, and the individual elements can have values of 0 or 1, where 0 represents the user not having purchased, viewed, or otherwise interacted with an item during a time period (or event period, such as a number of events have occurred) and 1 represents the user having purchased, viewed, or otherwise interacted with the item during the time period (or event period). Illustratively, the history of the user during the time period (or event period), such as a day, a week, a month, a year, or several years, can be used to determine a probability of the user purchasing items during a subsequent time period (or event period, such as one event has occurred), which may be the same length or of a different length than the purchase history time period (or event period). As another example, the elements of the input vector 110 can be 0 or a positive integer, where 0 represents the user not having purchased, viewed, or otherwise interacted with an item during a time period (or event period) and a positive integer represents a number of times that the user purchased, viewed, or otherwise interacted with the item during the time period (or event period).

In some embodiments, the elements of the input vector 110 can include non-behavior information associated with items. For example, the non-behavior information associated with items can include features of items purchased by the user. Features of items purchased can include a numeric or alphanumeric identifier of the items, a description of the items, the cost of the items, a life expectancy of the items, a category of the items, whether the items are fungible, and/or other characteristics of the items. In some embodiments, the elements of the input vector 110 can include attributes of the user. For example, the attributes can include the user's age, gender, geographic location, interests, etc. In some embodiments, the input vector 110 can include information other than the specific examples described herein, some combination of different types of information, etc.

Each data element of the output vector 112 may be a value, such as a floating-point number or integer. In some embodiments, the elements of the output vector 112 can represent, correspond to, or otherwise be associated with a probability of occurrence of an event (e.g., the user purchasing, viewing, or interacting with items or representations of items) during a subsequent time period (or event period). For example, the values of elements of the output vector 112 can be 0 or any positive number, representing or otherwise associated with the predicted probability of the user interacting with an item during the subsequent time period (or event period). The values of individual elements may not represent actual probabilities of individual events, but may nevertheless representative relative probabilities of individual events with respect to other events. For example, an output vector element value corresponding to event A may be higher than an output vector element value corresponding to event B, and may therefore indicate that A is more likely to occur than B, even though the actual element values are not probabilities.

A computing system, such as the computing system 600 shown in FIG. 6 and described in greater detail below or some other computing system, may deploy a NN 102 or a part of the NN 102 for use in a data processing computing environment. As shown, the NN 102 may determine a value indicative of a probability of purchase of an item (or a probability of an action regarding an object, such as a data object or a search string) by a user based on a purchase history of the user with respect to another item. In one embodiment, the input vector 110 of the NN 102 would be provided to a computer processor that stores or otherwise has access to the weight matrix W0. The processor would then multiply the input vector 110 of the NN 102 by the weight matrix W0 to produce an intermediate vector. The processor may adjust individual values in the intermediate vector using an offset or bias that is associated with the internal layer 106 of the NN 102 (e.g., by adding or subtracting a value separate from the weight that is applied). In addition, the processor may apply an activation function to the individual values in the intermediate vector (e.g., by using the individual values as input to a sigmoid function or a rectified linear unit (ReLU) function). The processor may multiply the intermediate vector by the weight matrix W1 to generate the output vector 112 of the NN 102. The processor may adjust individual values of the multiplication result using an offset or bias that is associated with the output layer 106 of the NN 102 to generate the output vector 112 of the NN 102. In addition, the processor may apply an activation function to the individual values of the multiplication result, after applying an offset or bias to each individual value of the multiplication result, if any, to generate the output vector 112 of the augmented NN 102. Elements of the output vector 112 of the NN 102 may be real numbers in the range [0, 1]. Such real numbers may also be referred to as analog values.

In some implementations, the NN 102 can be defined by equations [1]-[2] below.

$$A_1 = \text{Activation}(W_0 \cdot A_0 + B_0); \text{ and} \quad [1]$$

$$\hat{Y} = \text{Activation}(W_1 \cdot A_1 + B_1); \quad [2]$$

where $A_0$ denotes the input vector 110; $W_0$ denotes the weight matrix that includes the weights associated with the connections from the input layer 104 to the internal layer 106; $B_0$ denotes an offset or a bias that is associated with the internal layer 106 of the NN 102; Activation(*) denotes an activation function, such as a Relu or a sigmoid function; $A_1$ denotes the output of the input layer 104 or the input of the internal layer 106; $W_1$ denotes the weight matrix that includes the weights associated with the connections from the internal layer 106 to the output layer 108; $B_1$ denotes an offset or a bias that is associated with the output layer 108 of the NN 102; and $\hat{Y}$ denotes the output vector 112.

FIG. 1B is a diagram of an illustrative partial artificial neural network of the artificial neural network illustrated in FIG. 1A for generating an intermediate vector corresponding to an output of an internal layer of the artificial neural network according to some embodiments. A computing system, such as the computing system 600 shown in FIG. 6 and described in greater detail below or some other computing system, may deploy a part of the NN 102 (referred to as a partial NN 102') for use in a data processing computing environment. As shown, the partial NN 102' includes the input layer 104, the weight matrix W0, and the internal layer 106 of the NN 102. The partial NN 102' may determine an intermediate vector 114 representing an output of the internal layer 106 of the partial NN 102' using an input vector 110. The input vector 110 can be encoded using, for example, one-hot encoding. An input vector 110 that is encoded can be referred to as an input encoding. Each data element of the input vector 110 may be a value, such as an integer.

In some embodiments, one data element of the input vector 110 has a value of one, and the remaining data elements of the input vector 110 have values of zeros. With such input vector 110, the partial NN 102' can generate an intermediate vector 114. The intermediate vector 114 generated using such input vector 110 can be considered a representation of an item or an event represented by the element of the input vector 110 with a value of one. For example, if the element of the input vector 110 with a value of one corresponds to an event of viewing a video, then the intermediate vector 114 can be considered a representation of the event of viewing the video. If the input vector 110 has a dimensionality of 10,000, and the internal layer 106 has a dimensionality of 200, then the intermediate vector 114 can be considered a representation of the 10,000 dimensional input vector corresponding to the event of viewing the video in a lower dimensional space of dimensionality 200 (e.g., an embedding in an embedding space). In one embodiment, two or more elements of the input vector 110 can have values of one, corresponding to two or more events. The corresponding intermediate vector 114 can be considered a representation of the two or more events in the 200-dimensional space.

In one embodiment, the input vector 110 of the partial NN 102' would be provided to a computer processor that stores or otherwise has access to the weight matrix W0. The processor would then multiply the input vector 110 of the partial NN 102' by the weight matrix W0 to produce the intermediate vector 114. In one embodiment, the processor may adjust individual values in the intermediate vector 114 using an offset or bias that is associated with the internal layer 106 of the partial NN 102' (e.g., by adding or subtracting a value separate from the weight that is applied). In addition, the processor may apply an activation function to the individual values in the intermediate vector 114 (e.g., by using the individual values as input to a sigmoid function or a rectified linear unit (ReLU) function). For example, the partial NN 102's can be defined by equation [1] above. As another example, the partial NN 102' can be represented by equation [1'] or [1"] below $$A_1 = W_0 \cdot A_0 + B_0; \text{ and} \quad [1']$$

$$A_1 = W_0 \cdot A_0; \quad [1'']$$

where $A_0$ denotes the input vector 110; $W_0$ denotes the weight matrix that includes the weights associated with the connections from the input layer 104 to the internal layer 106; $B_0$ denotes an offset or a bias that is associated with the internal layer 106 of the NN 102; and $A_1$ denotes the output of the input layer 104, the intermediate vector 114.

Example Training Data Generation

Figure 2:
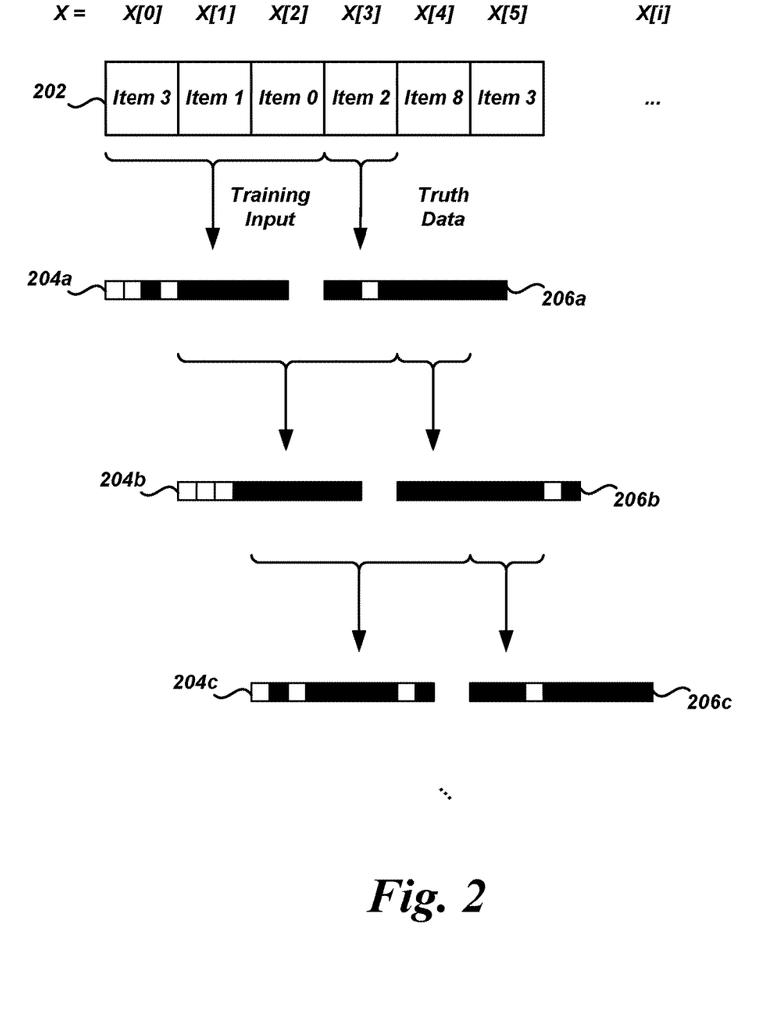
FIG. 2 is a schematic illustration of generating training input, including a plurality of training data input vectors, and corresponding truth data, including reference data output vectors, using occurrences of a type of event with respect to a plurality of items according to some embodiments.

FIG. 2 is a schematic illustration of generating training input, including a plurality of training data input vectors, and generating corresponding truth data, including reference data output vectors, using occurrences of a type of event with respect to a plurality of items according to some embodiments. Event data, such as one or more occurrences of a type of event (such as clicking, viewing, or watching), associated with a user can be represented as an event vector X 202. The event data vector X 202 can represent a type of event or interaction of the user with respect to individual items of the plurality of items. The elements of the event data vector X 202 can be represented as X[i], such that the event or interaction represented by X[i] occurs before the subsequent event or interaction represented by X[i+1], where i is zero or any positive integer. The user may have interacted with n items. In FIG. 2, the chronological order of the user interacting with the n items can be item 3, item 1, item 0, item 2, item 8, item 3, . . . . As shown, a user may have interacted with the same item at different times.

In some embodiments, events with respect to a user that are close in time or that are one after another (even if there is a gap in time between two consecutive events) can be considered related. For example, if a user interacts with item 3 after the user interacts with items 4, 2, and 1 chronologically, then item 3 can be considered to be related to items 4, 2, and 1. Thus, training data including training input and truth data can be generated from the event data associated with the user using a running window and a particular overlap. The training input can include a plurality of training data input vectors. The truth data can include a plurality of reference data output vectors. For example, the total running window can have a size of four, corresponding to four items that the user has interacted, or four events associated with the user that have occurred, with as represented by four consecutive elements of the event vector X 202. Items represented by the first three elements of the four consecutive elements can be used to generate a training data input vector. The item represented by the fourth element of the four consecutive elements can be used to generate a corresponding training data output vector.

As illustrated, if the user has interacted with six items, and the moving window has a size of four with an overlap of two, three training data input vectors 204a-204c and three corresponding training data output vectors 206a-206c can be generated. For illustration, elements of the training data input vector 204a that correspond to items 3, 1, and 0 are colored black. The element of the training data output vector 206a that corresponds to item 2 is colored black. Elements of the training data input vector 204b that correspond to items 1, 0, and 2 are colored black. The element of the training data output vector 206b that corresponds to item 8 is colored black. Elements of the training data input vector 204c that correspond to items 0, 2, and 8 are colored black. The element of the training data output vector 206c that corresponds to item 3 is colored black.

In some embodiments, the temporal relationship of the first three elements may not be considered in the generated training data. For example, whether the user has interacted with items 3, 1, and 0 chronologically, or with items 0, 3, and 1 chronologically, the training data input vector 204a remains the same. However, the training data input vector 204b can be different, depending on the order of interactions. The training data input vectors 204a-204c and corresponding training data output vectors 206a-206c generated can be used to train a NN, such as the NN 102.

The specific size of the running window in FIG. 2 is illustrative only, and is not intended to be limiting. In some implementations, the size of the running window can be 3, 4, 5, 10, 20, 50, 100, or more. The specific overlap in FIG. 2 is illustrative only, and is not intended to be limiting. In some implementations, the size of the running window can be 1, 2, 3, 4, 5, 10, 20, 50, 100, or more. For example, if the running window has a size of three and the overlap is zero, then two training data input vectors and two training data output vectors can be generated. The specific dimensionality of the training data input vectors 204a-204c and reference data output vectors 206a-206b in FIG. 2 is illustrative only, and is not intended to be limiting. In some implementations, the dimensionality of the training data input vectors 204a-204c and reference data output vectors 206a-206c can be 10, 100, 1000, 10,000, 100,000, or more, depending on the number of items available for interaction.

Example Co-Occurrence Data Determination

Figure 3:
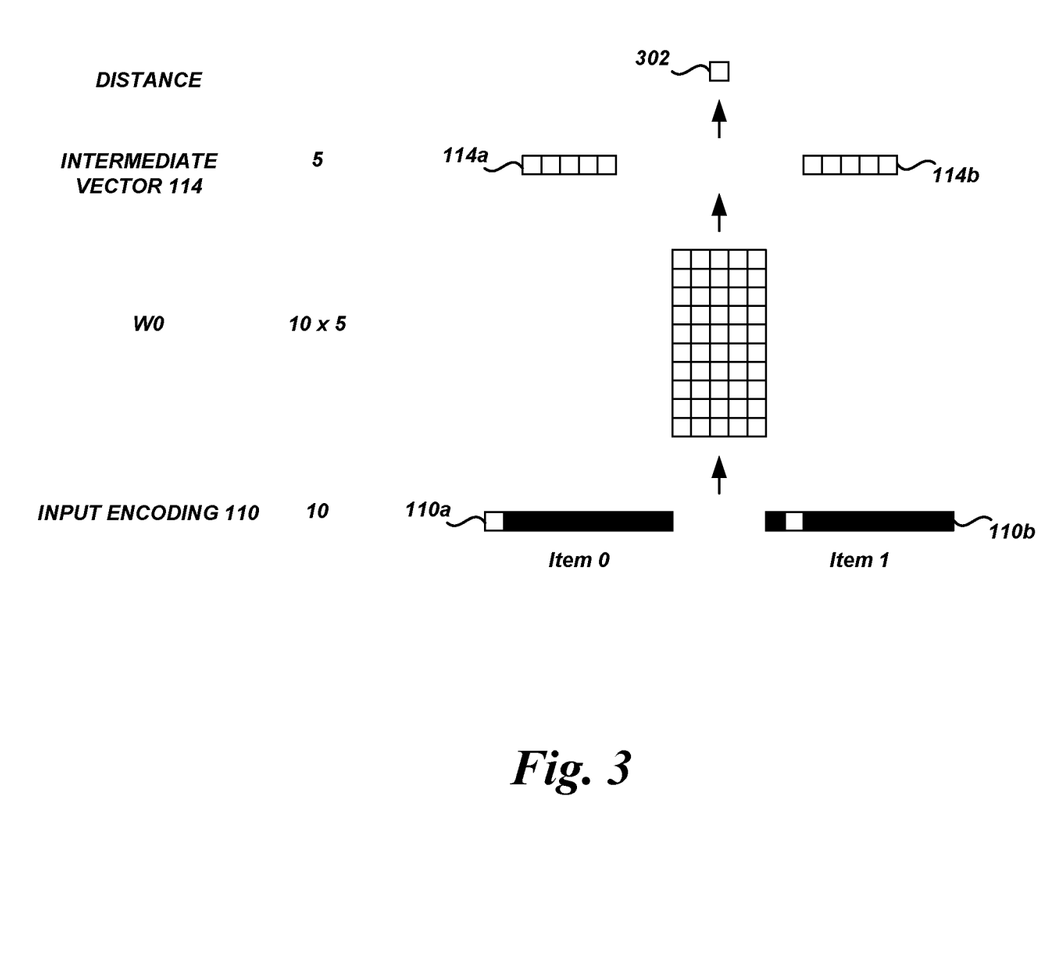
FIG. 3 is a schematic illustration of determining two intermediate vectors representing a first output and a second output of an internal layer of an artificial neural network according to some embodiments.

FIG. 3 is a schematic illustration of determining two intermediate vectors representing a first output and a second output of an internal layer of an artificial neural network (e.g., the partial NN 102') according to some embodiments. FIG. 3 illustrates determining a distance between the representations of items (or objects, such as data objects or search strings) 0 and 1 in a lower dimensional space (e.g., 5), even though the number of items available can be 10 or more.

In one embodiment, the input vectors 110a, 110b of the partial NN 102' would be provided to a computer processor that stores or otherwise has access to the weight matrix W0. The input vectors 110a, 110b can be encoded using, for example, one-hot encoding. Such encoded input vectors can be referred to as input encodings. The input vector 110a represents item 0. For example, an element of the input vector 110a that represents item 0 (e.g., the element with an index of 0) can have a value of one (or another integer or floating number), and all or some of the other elements of the input vector 110a can have a value of zero (represented as black boxes). The input vector 110a represents item 1. For example, the element of the input vector 110b with an index of 1 that represents item 1 can have a value of one, and all or some of the other elements of the input vector 110b can have a value of zero.

The processor would then multiply the input vector 110a of the partial NN 102' by the weight matrix W0 to produce the intermediate vector 114a. The processor would multiply the input vector 110b of the partial NN 102' by the weight matrix W0 to produce the intermediate vector 114b. In one embodiment, the processor may adjust individual values in the intermediate vectors 114a, 114b using an offset or bias that is associated with the internal layer 106 of the partial NN 102'.

Advantageously, hidden relationships between items or events can be explored in the lower dimensional space. Co-occurrence data, such as data based on user interactions with one item and also with another item, can be noisy. The fact that a given user or subset of users has interacted with two different items does not necessarily mean that the two items are related. For example, a cellphone cover may not be related to a shampoo even though a user may have purchased, viewed, or otherwise interacted with representations of both items (e.g., represented by items 3 and 1 in FIG. 2). Unrelated items may be far away from each other (using, e.g., cosine distance) in the lower dimensional embedding space. On the other hand, a user not having purchased, viewed, or otherwise interacted with two items does not mean the two items are not related. For example, shampoo brands A and B may be related, even though a user normally only has an interaction with shampoo brand A (e.g., represented by item 1). This user may have an interaction with one brand of hair conditioner (e.g., represented by item 0, such that the user can have interactions with both items at the same time). A second user can have an interaction with the same brand of hair conditioner and shampoo brand B. The relationship between shampoo brands A and B can be determined based on the distance 302. Related items can be clustered together in the lower dimensional space such that shampoo brands A and B can be close from a statistical distance metric standpoint.

In some embodiments, data representative of co-occurrence, clustering, or other relationships can be generated, modified, or augmented using the distance 302 between intermediate vectors 114a, 114b. For example, the processor can determine a distance 302 (e.g., a cosine distance) between the intermediate vectors 114a, 114b. The distance 302 can be used to generate or modify co-occurrence data (such as data on users who interact with one item also interact with another item). The co-occurrence data can comprise a likelihood of co-occurrence of a type of event or interaction with items 0 and 1. A system can use such data to filter noisy co-occurrence data. If the distance 302 satisfies a distance threshold (e.g., above the distance threshold), then the likelihood of co-occurrence of the two interactions in the existing co-occurrence data can be reduced or removed. As another example, the likelihood of occurrence of the two interactions can be set as a weighted sum of the existing likelihood of co-occurrence and an inverse of the distance 302. For example, the likelihood of co-occurrence of the two interactions can be determined based on the distance 302, such as an inverse of the distance.

The specific dimensionality of the input vectors 110a, 110b vector in FIG. 3 is illustrative only, and is not intended to be limiting. In some implementations, the dimensionality of input vectors 110a, 110b and output vectors 114a, 114b can be 10, 100, 1000, 10,000, 100,000, or more, depending on the number of items available for interaction. The specific dimensionality of the intermediate vectors 114a, 114b in FIG. 3 is illustrative only, and is not intended to be limiting. In some implementations, the size of the intermediate vectors 114a, 114b can be 10, 100, 200, 500, 1000, 10,000, or more.

Figure 4:
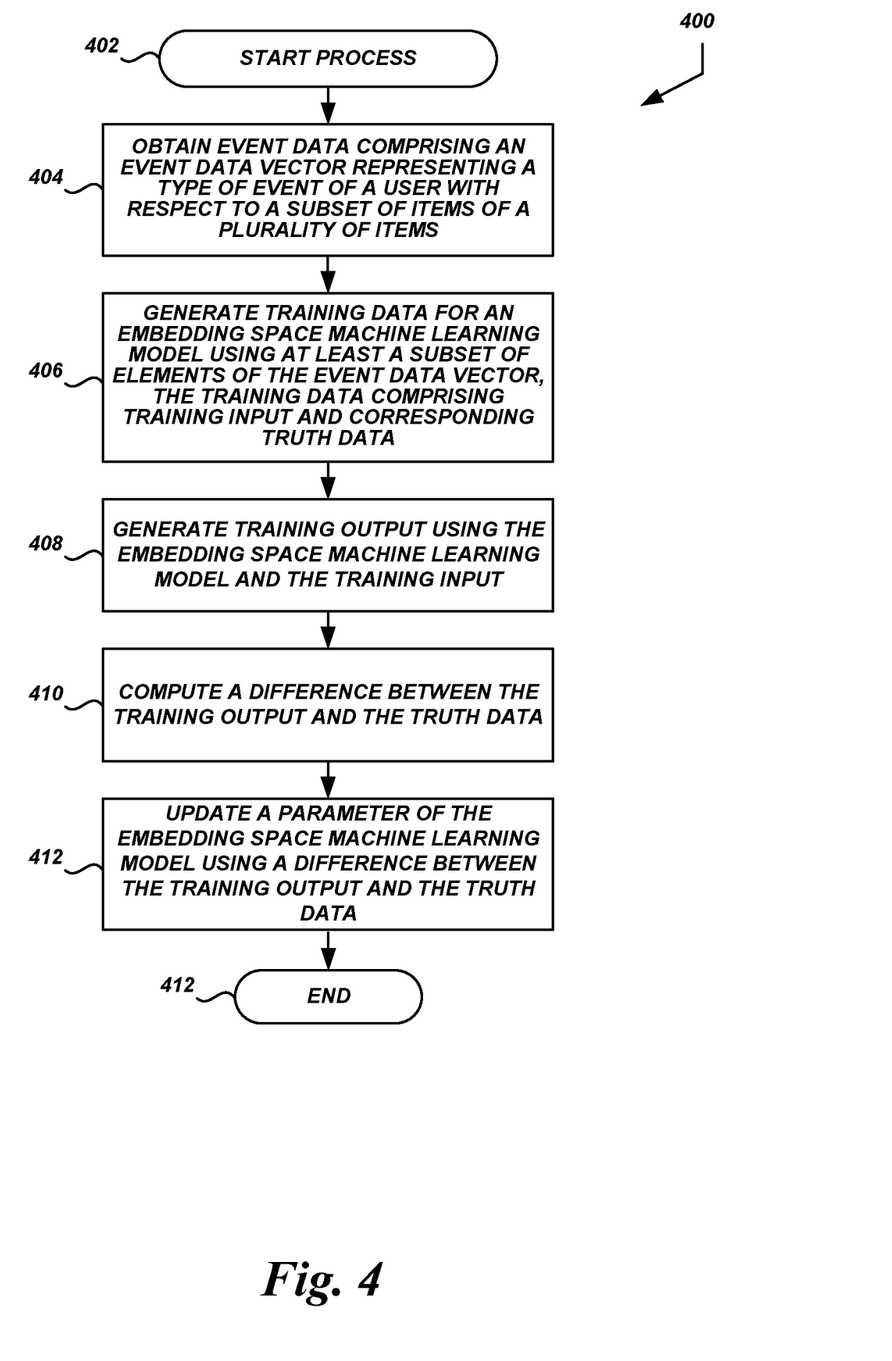
FIG. 4 is a flow diagram of an illustrative process for training a machine learning model with training data generated using event data according to some embodiments.

Example Process for Generating Training Data Using Event Data and Using the Training Data to Train a Machine Learning Model FIG. 4 is a flow diagram of an illustrative process for training a machine learning model, such as an embedding space NN, with training data generated using event data according to some embodiments. The process 400 begins at block 402. The process 400 may be embodied in a set of executable program instructions stored on a computer-readable medium, such as one or more disk drives, of a computing system, such as the computing system 600 shown in FIG. 6 and described in greater detail below. When the process 400 is initiated, the executable program instructions can be loaded into memory, such as RAM, and executed by one or more processors of the computing system 600. Although the process 400 is described with respect to the computing system 600 shown in FIG. 6, the description is illustrative only and is not intended to be limiting. In some embodiments, the process 400 or portions thereof may be performed serially or in parallel by multiple computing systems.

At block 404, the computing system 600 or some other computing system can in some embodiments obtain event data. The event data can comprise an event data vector, such as the event data vector 202 X shown in FIG. 2. The event data vector can represent a first type of event (e.g., a viewing event, a listening event, a reading event, a watching event, a searching event, or an interaction event) of a first user with respect to some or all items of a plurality of items (or objects more generally). In some embodiments, to obtain the event data, event data can be recorded can processed.

At block 406, the computing system 600 or some other computing system can in some embodiments generate training data using the event data. The training data can be used in training an embedding space machine learning model, such as the NN 102 shown in FIG. 1A. For example, the training data may include training input and corresponding truth data. Training data can include input vectors that with feature data for a recommendation process to be performed (e.g., item recommendation generation). Each training data input vector may be associated with a reference data output vector of the truth data. The reference data output vector can be a correct or otherwise expected output. The training input and the truth data can be encoded using, for example, one-hot encoding. Element of a training data input vector can correspond to data representing a purchase history of a user with respect to a plurality of existing items (e.g., items with available behavior information of users). In some embodiments, the training data can include a plurality of training data input vectors and their corresponding reference data output vectors.

The event data can include one or more event data vectors, each associated with a user. In some embodiments, a user can be associated with two or more event data vectors. The computing system 600 can generate training data input vectors and reference data output vectors using the one or more event data vectors as illustrated in FIG. 2. For example, training data for the machine learning model can be generated using at least a subset of elements of the event data vector. The training data for the embedding space machine learning model can comprise a first training data input vector and a first corresponding reference data output vector. An element of the first training data input vector can correspond to data representing the first type of event of the first user with respect to a first item of the subset of items at a first time. An element of the first reference data output vector can correspond to data representing the first type of event of the first user with respect to a second item of the subset of items at a second time. The second time can be subsequent to the first time.

In one embodiment, the element of the first reference data output vector has a value of one, and wherein a majority of elements of the first reference data output vector have zero values. In another embodiment, all elements of the first reference data output vector, except the element of the reference output vector that corresponds to data representing the first type of event of the first user with respect to the second item, have zero values.

To generate the first training data, the computing system 600 can implement the rolling window method described above with reference to FIG. 2. For example, to generate the first training data, the computing system 600 can generate the training data comprising a second training data input vector and a second corresponding reference data output vector. An element of the second training data input vector can correspond to data representing the first type of event of the first user with respect to the second item at the second time. An element of the second reference data output vector can correspond to data representing the first type of event of the first user with respect to a third item of the subset of items at a third time. The second element and a third element of the event data vector that are adjacent comprise data representing the second item and the third item respectively.

At block 408, the computing system 600 or some other computing system can in some embodiments generate training output using the machine learning model and the training input. For example, the computing system 600 can generate a training data output vector using the machine learning model and the training data input vector (or generate training data output vectors using the machine learning model and the training data input vectors). For example, the computing system 600 can generate a training data output vector from a training data input vector. The training data input vector and the training data output vector may have the same or different dimensions. The corresponding reference data output vector can be used during the training process to determine how accurate the machine learning model is in processing the training data input vector.

In some embodiments, sets of training data input vectors (e.g., "mini batches") may be arranged as input matrices. Each row of an input matrix may correspond to an individual training data input vector, and each column of the input matrix may correspond to an individual node of the input layer 104 of the NN 102. The data element in any given input vector for any given node of the internal layer 104 may be located at the corresponding intersection location in the weight matrix W0. For example, the training data can represent on-demand video purchase and view histories. There can be 100,000 videos available for purchase or view. Thus, the dimensionality of the training data input vectors and reference data output vectors can be 100,000.

At block 410, the computing system 600 can in some embodiments compute a difference between the training output and the truth data. For example, the computing system 600 can compute a difference between the training data output vector generated at block 408 and the reference data output vector generated at block 406. The reference data output vector can be used during the training process to determine how accurate the machine learning model is in processing the corresponding reference data output vector. Each training data input vector may be associated with a single correct or expected classification, e.g., the corresponding reference data output vector. The goal of training may to minimize the difference between a training data output vector and the reference data output vector. In some embodiments, the computing system 600 may compute the difference using a loss function, such as a cross-entropy loss function, a L2 Euclidean loss function, a logistic loss function, a hinge loss function, a square loss function, or a combination thereof.

At block 412, the computing system 600 or some other computing system can in some embodiments update a parameter of the machine learning model based on a difference between the training data output vector generated at block 406 and the reference data output vector (or differences between training data output vectors and reference data output vectors). To update a parameter of the machine learning model, the computing system 600 can in some embodiments compute a gradient based on the difference between the training data output vector and the reference data output vector (or differences between the training data output vectors and the reference data output vectors). For example, a derivative, or "gradient," can be computed that corresponds to the direction in which each parameter of the machine learning model is to be adjusted in order to improve the model output (e.g., to produce output that is closer to the correct or preferred output for a given input).

In some embodiments, the computing system 600 can update some or all parameters of the machine learning model using a gradient descent method. In one embodiment, parameters of the machine learning model (e.g., the weights of the model) are updated using back propagation. In back propagation, a training error is determined using a loss function, and the training error may be used to update the individual parameters of the machine learning model in order to reduce the training error. A gradient may then be computed for the loss function to determine how the weights in the weight matrices are to be adjusted to reduce the error. The adjustments may be propagated back through the NN 102 layer-by-layer. Some example processes for training a NN are described in commonly-owned U.S. patent Ser. No. 14/087,852 titled "DISTRIBUTED TRAINING OF MODELS USING STOCHASTIC GRADIENT DESCENT" and filed on Nov. 22, 2013, the disclosure of which is incorporated by reference herein in its entirety. The computing system 600 can in some embodiments determine whether termination criteria are met. For example, the termination criteria can be based on the accuracy of the machine learning model as determined using the loss function. If so, the process 400 can terminate the training process of the machine learning model and proceed to block 410. The process 400 ends at block 414.

Figure 5A:
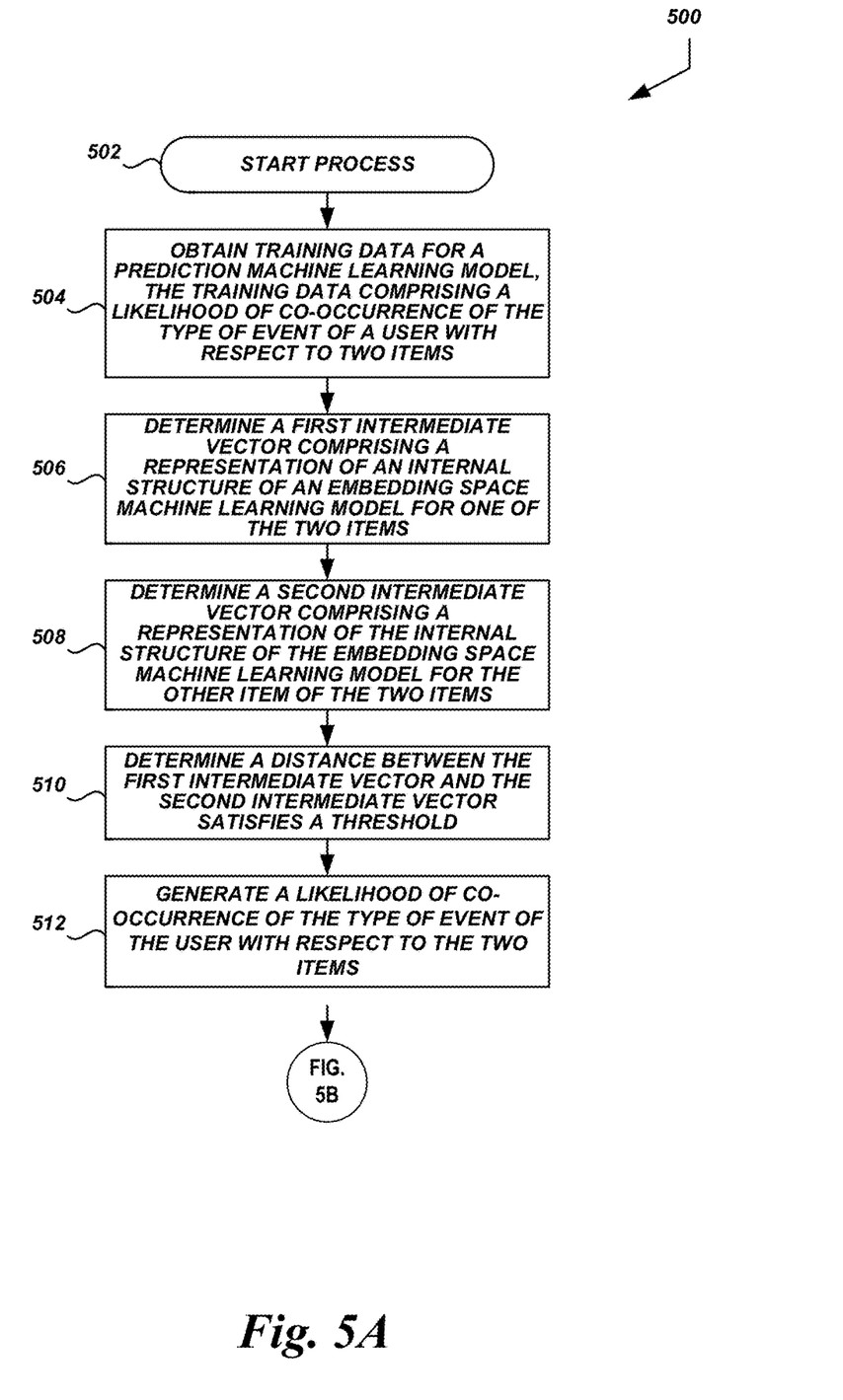
FIGS. 5A and 5B are flow diagrams of portions of an illustrative process for using the machine learning model trained as illustrated in FIG. 4 to generate a likelihood of co-occurrence, training another machine learning model using the likelihood of co-occurrence, and using the other machine learning model according to some embodiments.
Figure 5B:
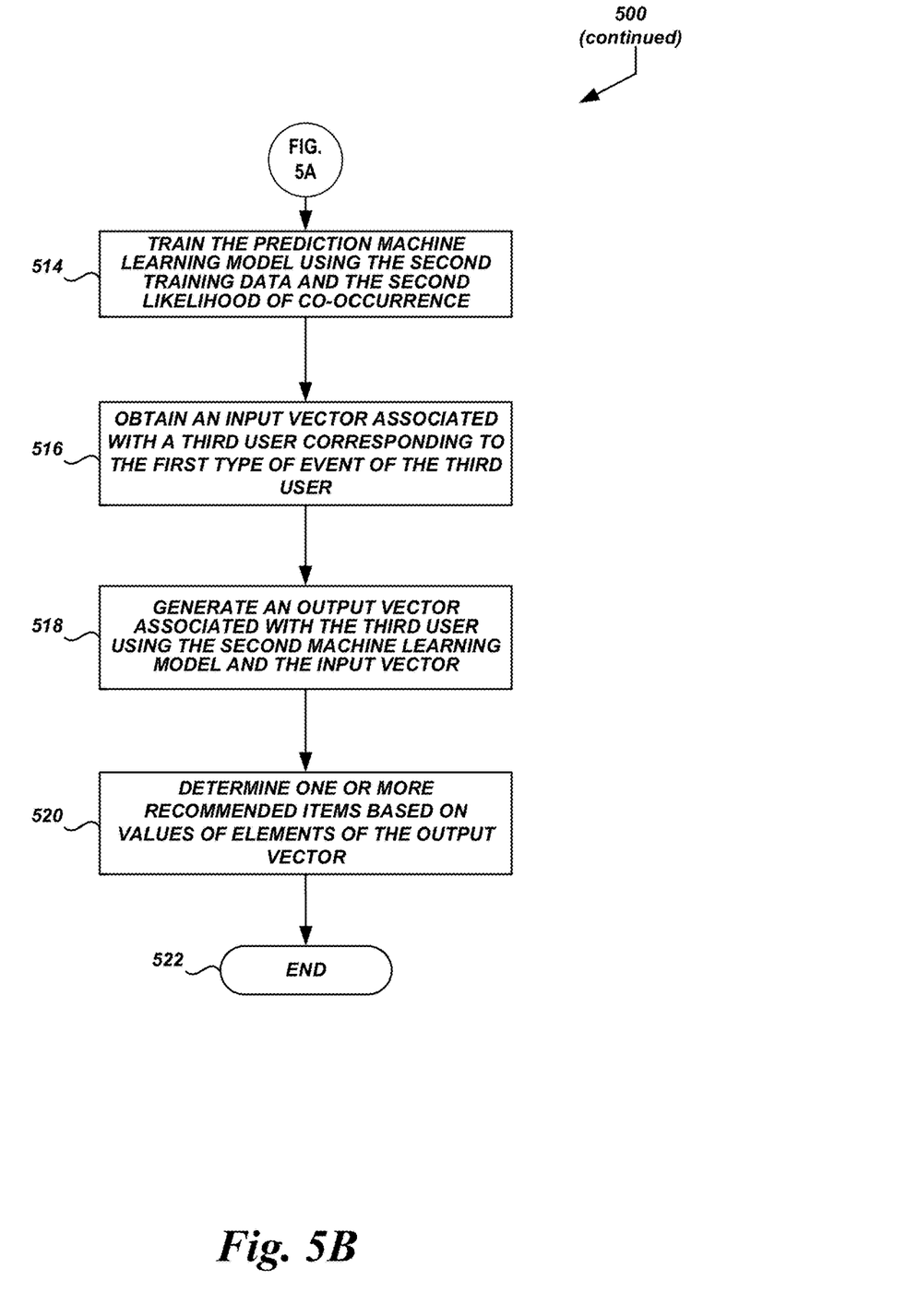

Example Process for Generating a Likelihood of Co-Occurrence Using a Machine Learning Model FIGS. 5A and 5B are flow diagrams of portions of an illustrative process for using a machine learning model trained as illustrated in FIG. 4 and described above. For example, the machine learning model may be used to generate a likelihood of co-occurrence or some other similarity or relationship between events, generate recommendations, etc. The process 500 may be embodied in a set of executable program instructions stored on a computer-readable medium, such as one or more disk drives, of a computing system, such as the computing system 600 shown in FIG. 6 and described in greater detail below. When the process 500 is initiated, the executable program instructions can be loaded into memory, such as RAM, and executed by one or more processors of the computing system 600. Although the process 500 is described with respect to the computing system 600 shown in FIG. 6, the description is illustrative only and is not intended to be limiting. In some embodiments, the process 500 or portions thereof may be performed serially or in parallel by multiple computing systems.

At block 504, the computing system 600 or some other computing system can in some embodiments obtain training data for training a prediction machine learning model. The second training data can comprise a likelihood of co-occurrence or some other relationship of the first type of event of a second user with respect to a first item and a second item.

At block 506, the computing system 600 or some other computing system can in some embodiments determine a first intermediate vector or an embedding. The first intermediate vector can comprise a first representation of an internal structure of an embedding space machine learning model (e.g., the NN 102' in FIG. 1A). For example, the first intermediate vector can be an output of the internal layer 106 of the partial NN 102' shown in FIG. 1B. To determine the first intermediate vector, the computing system 600 can multiply the first input vector with a weight matrix associated with an input layer and an internal layer of the embedding space machine learning model (e.g., the weight matrix W0 in FIGS. 1 and 3). The computing system 600 can apply an activation function to values of elements of the first input vector to generate the first intermediate vector.

At block 508, the computing system 600 or some other computing system can in some embodiments determine a second intermediate vector or an embedding. The second intermediate vector can comprise a second representation of the internal structure of the embedding space machine learning model. For example, the second intermediate vector can be an output of the internal layer 106 of the partial NN 102' shown in FIG. 1B. To determine the second intermediate vector, the computing system 600 can multiply the second input vector with the weight matrix associated with the input layer and the internal layer of the embedding space machine learning model. The computing system 600 can apply the activation function to values of elements of the second input vector to generate the second intermediate vector.

At block 510, the computing system 600 or some other computing system can in some embodiments determine a distance between the first intermediate vector and the second intermediate vector. For example, the distance can be based on a cosine distance between the first intermediate vector and the second intermediate vector. As another example, the distance can be based on a Euclidean distance or a correlation.

At block 512, the computing system 600 or some other computing system can in some embodiments generate a second likelihood of co-occurrence (or otherwise determine a relationship) of the first type of event of the second user with respect to the first item and the second item using the distance. For example, to generate the second likelihood of co-occurrence, the computing system 600 can perform one or more of the following steps: multiplying the likelihood of co-occurrence with a first multiplication factor to generate an adjusted likelihood of co-occurrence; multiplying the distance with a second multiplication factor to generate an adjusted distance; and summing the adjusted likelihood of co-occurrence and the adjusted distance to generate a sum, wherein the second data representing the likelihood of co-occurrence is based at least partly on the sum.

In some embodiments, after determining that the distance is above a threshold, the computing system 600 can filter the items recommended to a user. For example, based on a user's interaction with a content regarding a shampoo of brand A, the computing system 600 can determine items to recommended to the user. The items recommended to the user can be a shampoo of brand B, a conditioner, a soap, and a cellphone cover. The likelihood of co-occurrence of the brand A shampoo and brand B shampoo, determined using the distance between intermediate vectors or other embeddings for the items, can be high. The likelihood of co-occurrence of the brand A shampoo and the conditioner and the likelihood of co-occurrence of the brand A shampoo and the soap, determined using the distance between intermediate vectors or other embeddings for the items, can be sufficiently high. However, the likelihood of co-occurrence of the brand A shampoo and the cellphone cover, determined using the distance between intermediate vectors or other embeddings for the items, can be low. The computing system 600 can filter the items recommended to the user based on the likelihood of occurrence. For example, the cellphone cover may be filtered and not recommended to the user based on the low the likelihood of co-occurrence of the brand A shampoo and the cellphone cover.

In some embodiments, after determining the first distance is below a threshold, the computing system 600 can augment the training data for a second machine learning model, such as a prediction model, with data representing the second likelihood of co-occurrence of the first type of event with respect to the second item, using the second data representing the first likelihood of co-occurrence of the first type of event with respect to the first item and the first distance. To augment the training data, the computing system 600 can multiply the first likelihood of co-occurrence of the first type of event with respect to the first item and a third item with the first distance to generate a modified first likelihood of co-occurrence of the first type of event with respect to the first item and the third item. After multiplication, the computing system 600 can set the second likelihood of co-occurrence of the first type of event with respect to the second item and the third item as the modified first likelihood of co-occurrence of the first type of event with respect to the first item and the third item.

At block 514, the computing system 600 or some other computing system can in some embodiments train the second machine learning model using the second training data and the second likelihood of co-occurrence. In some embodiments, the process of training the second machine learning model can include generating a training data output vector using the second machine learning model and a training data input vector (or generate training data output vectors using the machine learning model and the training data input vectors), similar to the process performed at block 408. The process of training the second machine learning model can include computing a difference between the training data output vector and the reference data output vector, similar to the process performed at block 410. The training process can include updating a parameter of the machine learning using the difference, similar to the process performed at block 412.

At block 516, the computing system 600 or some other computing system can in some embodiments generate or obtain an input vector (e.g., an input vector that corresponds to behavior information associated with a third user) for the second machine learning model. The input vector can each include N separate data elements or "dimensions" (where N is some positive integer). The input layer of the machine learning model can include N nodes. In some embodiments, the input vector can include data representing behavior information of a user with respect to a plurality of items, or data representing actual occurrences or probabilities of occurrences of other events. For example, an element of the output vector can correspond to data representing the first type of behavior of a user with respect to an item.

At block 518, the computing system 600 or some other computing system can in some embodiments generate an output vector using the second machine learning model and the input vector. For example, the second machine learning model may generate an output vector with each element being an analog value in the range of [0, 1] from an input vector with each element being 0 or 1. The output vector can include N elements. Each data element of the output vector may be a value, such as a floating-point number or integer. In some embodiments, the elements of the output vector can correspond to a probability of the occurrence of some event, such as a user purchasing an item or performing some other action during a subsequent time period. For example, an element of the output vector can correspond to a probability of interaction with content regarding an item of a plurality of items. In some embodiments, the values of individual elements may not represent actual probabilities of individual events, but may nevertheless representative relative probabilities of individual events with respect to other events. For example, an output vector element value corresponding to event A may be higher than an output vector element value corresponding to event B, and may therefore indicate that A is more likely to occur than B, even though the actual element values are not probabilities.

At block 520, the computing system 600 or some other computing system can in some embodiments determine to recommend one or more items based at least partly on values of elements of the output vector. In some embodiments, the items recommended can be associated with values that are above a recommendation threshold or items with top n modified values. Alternatively, or in addition, the items recommended can be the items with top n modified values. In some embodiments, if a user has interacted with an item, the item is not recommended to the user even if the item is associated with a high modified value. The process 500 ends at block 522.

Although the steps of the process 500 are shown to be performed sequentially in FIGS. 5A and 5B, this order is illustrative only, and is not intended to be limiting. The process 500 or portions thereof may be performed serially or in parallel by one or more computing systems. In some embodiments, the process 500 can comprise three processes: one process comprising the steps illustrated in blocks 504-512, another process comprising the step illustrated in block 514, and a third process comprising the steps illustrated in blocks 516-520. The three processes can be performed sequentially, in parallel, synchronously, or asynchronously. The three processes may be performed independently of each other. In some embodiments, one process may be performed once while the other process may be performed multiple times. For example, the process comprising the steps shown in blocks 504-512 may be performed daily or weekly (e.g., when new behavior information becomes available), while the process comprising the steps shown in blocks 516-520 may be performed more or less frequently (e.g., to generate recommendations when a user accesses a network resource).

Execution Environment

Figure 6:
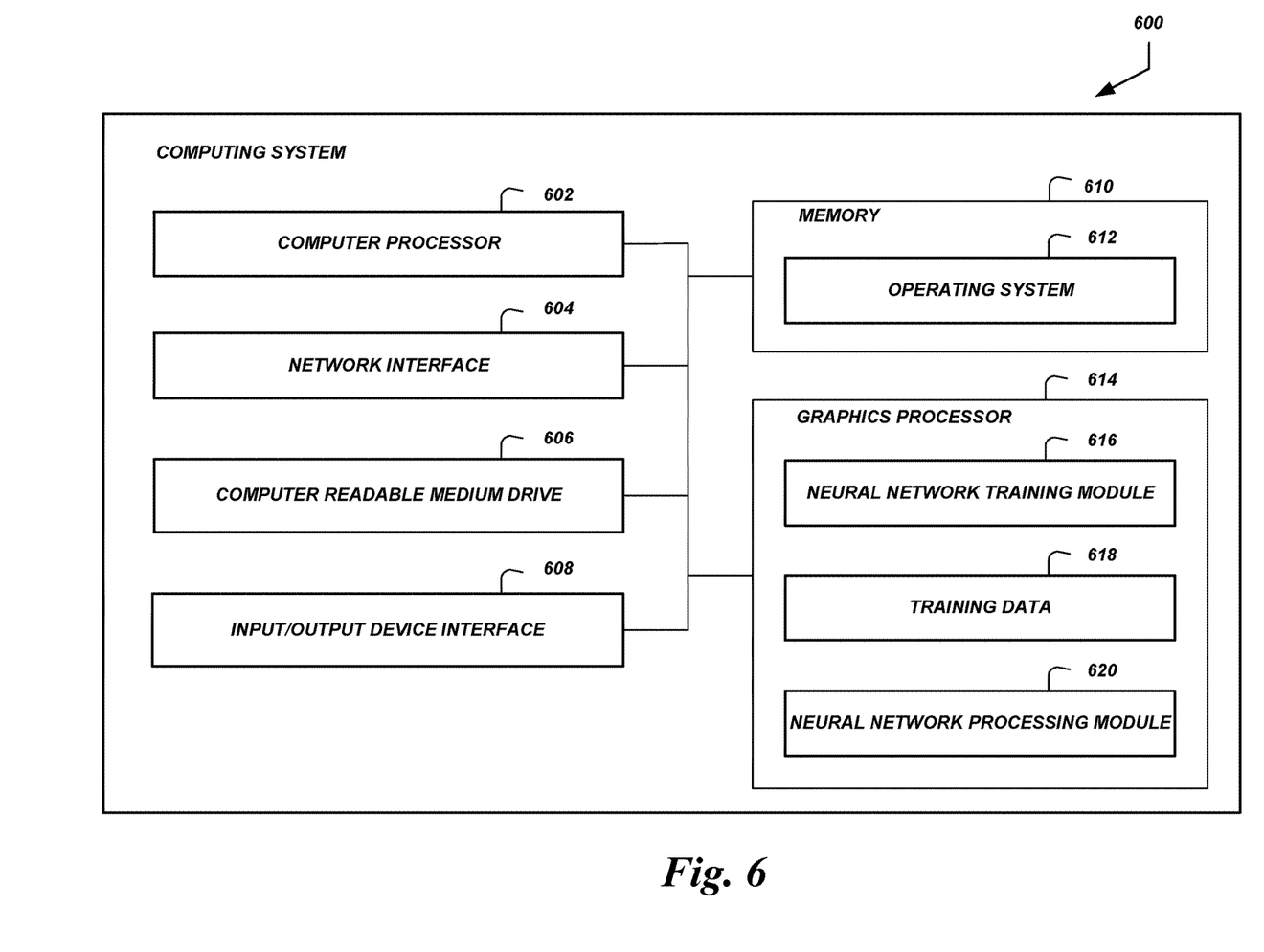
FIG. 6 is a block diagram of an illustrative computing system configured to implement training and processing of artificial neural networks according to some embodiments.

FIG. 6 illustrates an example computing system 600 that may be used in some embodiments to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as high density disks ("HDDs"), solid state drives ("SDDs"), flash drives, and/or other persistent non-transitory computer-readable media; an input/output device interface 608, such as an IO interface in communication with one or more microphones; one or more computer readable memories 610, such as random access memory ("RAM") and/or other volatile non-transitory computer-readable media; and one or more graphical processors 614, such as graphics processing units ("GPUs").

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure.

In some embodiments, the graphics processor 614 can include graphics memory such as random access memory ("RAM"). The graphics memory may include a NN and/or computer program instructions that the graphics processor 614 executes in order to implement one or more embodiments. For example, in one embodiment, the graphics memory may include a neural network training module 616 that performs the process 400 and/or 500 described above (or portions thereof) to obtain, generate, or otherwise process training data 618, train a neural network with the obtained, generated, or otherwise processed training data, and use the trained neural network for determining recommendations for users. In some embodiments, the training data 618 currently being processed by the NN may also be stored in the graphics memory, while the remainder of the training data can be stored in some other location, such as memory 610, a computer-readable medium drive 606, a network-accessible data store, etc. As another example, the graphics memory may include a neural network processing module 620 that performs portions of the process 400 and/or 500 described above to process the neural network generated by, for example, the neural network training module 616. In some implementations, the computing system 600 can include both the neural network training module 616 and the neural network processing module 620. In some implementations, the computing system 600 can include one of the neural network training module 616 or the neural network processing module 620. In some embodiments, multiple computing systems 600 may communicate with each other via their respective network interfaces 604, and can implement neural network training or processing separately (e.g., each computing system 600 may execute one or more separate instances of the processes 400 and/or 500), in parallel (e.g., each computing system 600 may execute a portion of a single instance of a process 400 and/or 500), etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
computer-readable memory storing executable instructions; and
one or more hardware-based processors programmed by the executable instructions to at least:
  obtain behavior data representing a first type of behavior of a first user with respect to items of a plurality of items;
  generate first training data for an embedding space artificial neural network using the behavior data, wherein the first training data comprises a first training input and a first corresponding truth data, wherein an element of the first training input corresponds to data representing the first type of behavior of the first user with respect to a first item of the plurality of items at a first time, wherein an element of the first truth data corresponds to data representing the first type of behavior of the first user with respect to a second item of the plurality of items at a second time, the second time occurring within a predetermined period of time after the first time;
  generate a training output using the embedding space artificial neural network and the training input;
  compute a difference between the training output and the truth data;
  update a parameter of an internal layer of the embedding space artificial neural network using the difference between the training output and the truth data;
  obtain second training data for a prediction artificial neural network, wherein the second training data comprises data representing a likelihood of co-occurrence of the first type of behavior of a second user with respect to both the first item and the second item;
  determine a first intermediate vector comprising a first representation of the internal layer of the embedding space artificial neural network using a first input, wherein an element of the first input corresponds to data representing the first item;
  determine a second intermediate vector comprising a second representation of the internal layer of the embedding space artificial neural network using a second input, wherein an element of the second input corresponds to data representing the second item;
  determine that a distance between the first intermediate vector and the second intermediate vector satisfies a threshold;
  generate a modified likelihood of co-occurrence using:
    the distance between the first intermediate vector and the second intermediate vector,
    the data representing the likelihood of co-occurrence of the first type of behavior of the second user with respect to both the first item and the second item, and
    one or more multiplication factors, wherein the one or more multiplication factors are applied to adjust at least one of the distance or the data representing the likelihood of co-occurrence; and train the prediction artificial neural network using the second training data and the modified likelihood of co-occurrence.

2. The system of claim 1, wherein the one or more hardware-based processors are programmed by the executable instructions to at least:
obtain a third input associated with a third user, wherein an element of the third input corresponds to data representing the first type of behavior of the third user with respect to a third item of the plurality of items;
generate a third output associated with the third user using the prediction artificial neural network and the third input, wherein an element of the third output corresponds to a probability of interaction of the third user with content regarding a fourth item of the plurality of items; and
determine to recommend the fourth item based at least partly on the third output.

3. The system of claim 2, wherein the instructions to determine to recommend the fourth item comprise instructions to determine to recommend the fourth item based at least partly on the element of the third output being above a recommendation threshold.

4. The system of claim 1, wherein the instructions to determine the distance between the first intermediate vector and the second intermediate vector comprise instructions to determine a cosine distance between the first intermediate vector and the second intermediate vector.

5. A computer-implemented method comprising:
under control of a computer system comprising one or more hardware processors configured to execute specific computer-executable instructions,
obtaining first training data for an embedding space machine learning model using data regarding one or more occurrences of a first type of event with respect to individual items of a plurality of items;
training the embedding space machine learning model using the first training data;
obtaining co-occurrence data comprising first data representing a first likelihood of co-occurrence of the first type of event with respect to a first item of the plurality of items and the first type of event with respect to a second item of the plurality of items;
determining a first intermediate vector representing a first output of an intermediate structure of the embedding space machine learning model using a first input comprising an element that corresponds to data representing the first item;
determining a second intermediate vector representing a second output of an intermediate structure of the embedding space machine learning model using a second input comprising an element that corresponds to data representing the second item;
determining a distance between the first intermediate vector and the second intermediate vector; and
generating second data representing a second likelihood of co-occurrence of the first type of event with respect to the first item and the second item, wherein the second data is generated using:
the distance,
the first likelihood of co-occurrence, and
one or more multiplication factors, wherein the one or more multiplication factors are applied to adjust at least one of the distance or the first likelihood of co-occurrence.

6. The computer-implemented method of claim 5, wherein obtaining the first training data for the embedding space machine learning model comprises:
obtaining the data regarding the one or more occurrences of the first type of event with respect to individual items of a plurality of items, wherein the data regarding the one or more occurrences of the first type of event with respect to individual items of a plurality of items comprises a first event data vector representing the first type of event of a first user with respect to a subset of items of the plurality of items; and
generating training data for the embedding space machine learning model using at least a subset of elements of the first event data vector, wherein the training data for the embedding space machine learning model comprises a first training input and a first corresponding truth data, wherein an element of the first training input corresponds to data representing the first type of event of the first user with respect to a first item of the subset of items at a first time, and wherein an element of the first truth data corresponds to data representing the first type of event of the first user with respect to a second item of the subset of items at a second time.

7. The computer-implemented method of claim 6, wherein an order of the subset of elements of the first event data vector is based at least partly on first temporal information of the first type of event of the first user with respect to the subset of items, and wherein a first element and a second element of the first event data vector that are adjacent comprise data representing the first item and the second item respectively.

8. The computer-implemented method of claim 6, wherein the element of the first truth data has a value of one, and wherein a majority of elements of the first truth data have zero values.

9. The computer-implemented method of claim 8, wherein all elements of the first truth data, except the element of the truth data that corresponds to data representing the first type of event of the first user with respect to the second item, have zero values.

10. The computer-implemented method of claim 6, wherein generating the training data comprises generating the training data comprising a second training input and a second corresponding truth data, wherein an element of the second training input corresponds to data representing the first type of event of the first user with respect to the second item at the second time, wherein an element of the second truth data corresponds to data representing the first type of event of the first user with respect to a third item of the subset of items at a third time, and wherein the second element and a third element of the first event data vector that are adjacent comprise data representing the second item and the third item respectively.

11. The computer-implemented method of claim 6, wherein obtaining the data regarding the one or more occurrences of the first type of event comprises obtaining data representing a viewing event, a listening event, a reading event, a watching event, a searching event, or an interaction event.

12. The computer-implemented method of claim 5, further comprising:
obtaining second training data comprising a third likelihood of occurrence of the first type of event of a first user with respect to the first item given the first type of event of the first user with respect to the second item; and training a prediction model using the second training data and the second data representing the second likelihood of co-occurrence.

13. The computer-implemented method of claim 5, wherein generating the second data representing the second likelihood of co-occurrence comprises:
   multiplying the likelihood of co-occurrence with a first multiplication factor of the one or more multiplication factors to generate an adjusted likelihood of co-occurrence;
   multiplying the distance with a second multiplication factor of the one or more multiplication factors to generate an adjusted distance; and
   summing the adjusted likelihood of co-occurrence and the adjusted distance to generate a sum, wherein the second data representing the second likelihood of co-occurrence is based at least partly on the sum.

14. The computer-implemented method of claim 5, wherein determining the first intermediate vector comprises:
   multiplying the first input with a weight matrix associated with an input layer and an internal layer of the embedding space machine learning model; and
   applying an activation function to values of elements of the first input to generate the first intermediate vector.

15. The computer-implemented method of claim 5, wherein training the embedding space machine learning model comprises training at least one of: a non-classification model, a neural network, a recurrent neural network (RNN), a linear regression model, a logistic regression model, a decision tree, a support vector machine, a Naïve Bayes network, a k-nearest neighbors (KNN) model, a k-means model, a random forest model, or a combination thereof.

16. A system comprising:
   computer-readable memory storing executable instructions; and
   one or more processors programmed by the executable instructions to at least:
      obtain a machine learning model, wherein the machine learning model is trained, using input data associated with an occurrence of a first type of event with respect to a first object, to generate output data representing a predicted occurrence of the first type of event with respect to a second object;
      obtain first co-occurrence data representing a first likelihood of co-occurrence of the first type of event with respect to the first object and the first type of event with respect to the second object;
      determine a first embedding, representing the first type of event with respect to the first object, and a second embedding, representing the first type of event with respect to the second object, using the machine learning model;
      determine a distance between the first embedding and the second embedding; and
      generate second co-occurrence data representing a second likelihood of co-occurrence of the first type of event with respect to the first object and the first type of event with respect to the second object, wherein the second co-occurrence data is generated using:
         the distance,
         the first likelihood of co-occurrence, and
         one or more multiplication factors, wherein the one or more multiplication factors are applied to adjust at least one of the distance or the first likelihood of co-occurrence.

17. The system of claim 16, wherein the executable instructions to determine the first embedding and the second embedding comprise executable instructions to:
   determine a first intermediate vector representing a first output of an intermediate structure of the machine learning model using a first input comprising an element that corresponds to data representing the first object, wherein the first intermediate vector represents the first embedding; and
   determine a second intermediate vector representing a second output of an intermediate structure of the machine learning model using a second input comprising an element that corresponds to data representing the second object, wherein the second intermediate output represents the second embedding.

18. The system of claim 16, wherein the one or more processors are further programmed by the executable instructions to:
   obtain training data for a prediction machine learning model, wherein the training data comprises first data representing the likelihood of co-occurrence;
   determine the distance is above a threshold; and
   generate a value of second data representing the likelihood of co-occurrence of the first type of event using the distance and a corresponding value of the first data.

19. The system of claim 18, wherein the one or more processors are further programmed by the executable instructions to:
   determine the distance is below a threshold; and
   augment the training data for the prediction machine learning model with data representing the likelihood of co-occurrence using the value of the second data representing the likelihood of co-occurrence.

20. The system of claim 19, wherein the executable instructions to augment the training data comprise executable instructions to:
   multiply the likelihood of co-occurrence of the first type of event with respect to the first object and a third object with the distance to generate a modified likelihood of co-occurrence of the first type of event with respect to the first object and the third object; and
   set a second likelihood of co-occurrence of the first type of event with respect to the second object and the third object as the modified likelihood of co-occurrence of the first type of event with respect to the first object and the third object.

\* \* \* \* \*

UNITED STATES PATENT AND TRADEMARK OFFICE
CERTIFICATE OF CORRECTION

PATENT NO. : 11,080,596 B1  
APPLICATION NO. : 15/623291  
DATED : August 3, 2021  
INVENTOR(S) : Roshan Makhijani et al.

Page 1 of 1

It is certified that error appears in the above-identified patent and that said Letters Patent is hereby corrected as shown below:

In the Specification

In Column 5, Line 2, delete "W0" and insert --$W_0$--.

In Column 5, Line 9, delete "W1" and insert --$W_1$--.

In Column 17, Line 14, delete "("SDDs")," and insert --("SSDs"),--.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*